US010581982B2

(12) United States Patent
Georgiou et al.

(10) Patent No.: US 10,581,982 B2
(45) Date of Patent: Mar. 3, 2020

(54) MOBILITY OF APPLICATION SERVICES IN A DISTRIBUTED COMPUTING SYSTEM

(71) Applicant: Facebook, Inc., Menlo Park, CA (US)

(72) Inventors: Thomas Apostolos Georgiou, Reston, VA (US); Haobo Xu, Palo Alto, CA (US); Jason Curtis Jenks, Lynnwood, WA (US); Hairong Kuang, San Jose, CA (US)

(73) Assignee: Facebook, Inc., Menlo Park, CA (US)

( * ) Notice: Subject to any disclaimer, the term of this patent is extended or adjusted under 35 U.S.C. 154(b) by 647 days.

(21) Appl. No.: 15/094,065

(22) Filed: Apr. 8, 2016

(65) Prior Publication Data
US 2017/0295246 A1 Oct. 12, 2017

(51) Int. Cl.
*H04L 29/08* (2006.01)
*H04L 12/26* (2006.01)

(52) U.S. Cl.
CPC ........ *H04L 67/148* (2013.01); *H04L 43/0864* (2013.01); *H04L 67/10* (2013.01)

(58) Field of Classification Search
CPC ... H04L 67/148; H04L 43/0864; H04L 67/10; H04L 67/1002; H04L 67/1004
See application file for complete search history.

(56) References Cited

U.S. PATENT DOCUMENTS

| | | | |
|---|---|---|---|
| 8,719,225 B1 | 5/2014 | Rath et al. | |
| 8,843,441 B1 | 9/2014 | Rath et al. | |
| 9,116,862 B1 | 8/2015 | Rath et al. | |
| 9,122,741 B1 | 9/2015 | McAlister et al. | |
| 9,307,080 B1* | 4/2016 | Fernandez | H04M 3/493 |
| 9,367,410 B2 | 6/2016 | Tang et al. | |
| 2009/0276771 A1* | 11/2009 | Nickolov | G06F 9/4856 717/177 |
| 2012/0166390 A1 | 6/2012 | Merriman et al. | |
| 2012/0254175 A1* | 10/2012 | Horowitz | G06F 17/30584 707/737 |
| 2012/0259894 A1 | 10/2012 | Varley et al. | |
| 2012/0271909 A1* | 10/2012 | Huang | H04L 61/1511 709/217 |
| 2013/0219043 A1* | 8/2013 | Steiner | G06F 9/4856 709/224 |

(Continued)

OTHER PUBLICATIONS

Non-Final Office Action dated Oct. 6, 2017 of U.S. Appl. No. 15/094,102 by Mehta, V., et al., filed Apr. 8, 2016.

(Continued)

*Primary Examiner* — Aftab N. Khan
*Assistant Examiner* — Anh Nguyen
(74) *Attorney, Agent, or Firm* — FisherBroyles, LLP (57) ABSTRACT

The disclosure is directed to moving an application, e.g., a messenger service in a social networking application, to various locations in a distributed computing system, e.g., to improve an efficiency of the application. For example, the application can be moved to a data center that is closer to a location of a user to decrease a latency associated with accessing the application. In another example, the application can be moved to a data center that is closer to a location of a storage system that stores data associated with the application to improve a throughput of the application, e.g., a rate at which data is read and/or written.

20 Claims, 9 Drawing Sheets

(56) References Cited

U.S. PATENT DOCUMENTS

| | | |
|---|---|---|
| 2014/0012814 A1* | 1/2014 | Bercovici ......... G06F 17/30578 |
| | | 707/636 |
| 2014/0195486 A1 | 7/2014 | Kulkarni et al. |
| 2014/0237090 A1 | 8/2014 | Lassen et al. |
| 2015/0281104 A1* | 10/2015 | Golshan ................ H04L 47/125 |
| | | 370/238 |
| 2015/0317349 A1 | 11/2015 | Chao et al. |
| 2017/0206148 A1 | 7/2017 | Mehta et al. |
| 2017/0293540 A1 | 10/2017 | Mehta et al. |

OTHER PUBLICATIONS

U.S. Appl. No. 15/001,741 by Mehta, V., et al., filed Jan. 20, 2016.
U.S. Appl. No. 15/094,102 by Mehta, V., et al., filed Apr. 8, 2016.

* cited by examiner

MOBILITY OF APPLICATION SERVICES IN A DISTRIBUTED COMPUTING SYSTEM

BACKGROUND

A distributed computing system can include a number of server computer devices ("servers") for processing data requests from users. The user requests can be distributed among the servers, e.g., to balance a load between the servers. Some distributed computing systems use specialized servers, referred to as load-balancing servers, that perform the load-balancing functions to distribute the user requests among the servers. The load-balancing servers can use various techniques and algorithms to distribute the load among the servers. Some load-balancing techniques distribute user requests from mobile devices to a first set of servers and user requests from desktops to another set of servers. Some load-balancing techniques send requests received from the user at different instances to different servers while some load-balancing techniques send all requests from a single user to the same server.

Some load-balancing techniques determine a server to transmit the user request based on user related information e.g., user identification ("ID") of the user. For example, the load-balancing techniques use a hash function on the user ID to determine a server to which the user request is to be transmitted. Such a load-balancing technique can be disadvantageous. For example, consider that a client computing device ("client device") of the user using which the user sends a data access request is in a first location and two servers, e.g., a first server is in the first location and a second server is in the second location. Further, consider that a latency between the client device and the first server is less than the latency between the client device and the second server, e.g., as the first server is more proximate to the client device than the second server is to the client device. When a load-balancing server determines the server using a hash function on the user ID, the hash function can result in identifying the second server the latency of which is greater than that of the first server. This can result in the user experiencing a higher latency in accessing the data than the user would have if the request were to be transmitted to the first server.

Further, some distributed computing systems do not permit the data associated with the user or an application the user is accessing to be moved from one server to another server. Once a specified server is identified for the user, e.g., initially when the user issued a first data access request, the data access requests from that user is mostly forwarded to the same specified server. This can be disadvantageous, e.g., when the user moves from one region to another region, and the latency can increase if the user has moved further away from the specified server and the user can experience a significant delay in accessing the data.

DETAILED DESCRIPTION

Embodiments are disclosed for moving an application, e.g., a messenger service in a social networking application, to various locations in a distributed computing system, e.g., to improve an efficiency of the application. For example, the application can be moved to a data center that is closer to a location of a user to decrease a latency associated with accessing the application. In another example, the application can be moved to a data center that is closer to a location of a storage system that stores data associated with the application to improve a throughput of the application, e.g., a rate at which data is read and/or written. When a user issues an access request for accessing the application, a load-balancing server computing device ("load-balancing server") receives the access request and forwards the access request to one of many application server computing devices ("app servers") of a data center that serves the access request. The embodiments analyze access logs to determine various factors, e.g., the load-balancing servers the user connects with, the data centers to which a load-balancing server forwards the access requests, latency between the load-balancing server and the data center, and a throughput of the application. The embodiments can consider the above factors and migrate the application to an appropriate data center, e.g., either to improve latency or throughput.

The application is implemented in a distributed computing system that includes a number of data centers each having one or more app servers, and a number of load-balancing servers. The data centers are distributed across geographical locations, e.g., regions. A region can be a country, a continent, a city or some other geographical area/location. The load-balancing servers can also be distributed across geographical locations. In some embodiments, in a specified region, there can be more number of load-balancing servers than the number of data centers.

After the embodiments determine a data center to which the application is to be migrated, the embodiments transmit a hint that indicates a data center from which the user requests are to be served to a client computing device ("client device") associated with the user. The client device can include the hint in subsequent access requests. When a load-balancing server receives the request from the client device, it forwards the request to the appropriate data center based on the hint. In some embodiments, the hint is a data center identifier (ID) of a data center to which the request is to be forwarded. In some embodiments, the data center ID is in a string format and identifies a specified data center.

In some embodiments, the application is moved to improve latency, e.g., time taken for the client device to access the application. The latency can be a function of a latency between a load-balancing server to which the client device connects and a data center to which the load-balancing server transmits the access request from the client device. The latency can be decreased by having the load-balancing server forward the access request to a first data center the latency between which is the less compared to the current data center that is serving the access requests from the client device. In some embodiments, such a data center can be a data center that is located in a region most proximate to a location of the user. Accordingly, the application can be moved to an app server of the first data center from an app server of the current data center that is located in a region that is less proximate to the user location.

The embodiments analyze access logs to determine if the client device experiences less latency in accessing the application if the client device is served by a different data center than from the one the client device is currently being served. For example, the embodiments determine the load-balancing servers that are currently receiving access requests from the client device, a data center to which a load-balancing server forwards the access requests, a current latency between the load-balancing server and the data center for each of the access requests. Based on the location of the load-balancing servers being accessed by the client device, the embodiments can determine a specified data center in a region that is most proximate to the location of the load-balancing servers (and therefore to the user). The embodiments can determine latency between the specified data center and the load-balancing server. If the latency between the specified data center and the load-balancing server is less than the current latency, the embodiments can migrate the application to the specified data center. For example, if the application is a messenger service that facilitates users to send and/or receive messages, the embodiments can move the messaging service and a message queue having messages associated with the user to the specified data center and serve the subsequent messaging requests from the user using the specified data center.

In some embodiments, migrating the application to the specified data center includes identifying a shard with which the user is to be associated and moving the application and the application data, e.g., data associated with the user, to an app server that hosts the shard in the specified data center. In some embodiments, the application is associated with a dataset, e.g., user data of the users of the application. The dataset can be partitioned into a number of shards, each of which can contain a portion of the dataset. In some embodiments, a shard is a logical partition of data. Each of the shards can contain data of a subset of the users and different sets of shards can be managed by different data centers and within a data center, different shards can be hosted by different app servers of the data center. For example, a first set of shards can be hosted by a first data center and a second set of shards can be hosted by a second data center. Also, a first shard in the first set of shards can be hosted by a first app server of the first data center and a second shard of the first set of shards can be hosted by a second app server of the first data center.

In some embodiments, the application can be moved to increase the throughput of the application for the user. If the rate at which the application data is generated for the user exceeds a specified threshold, the application is moved to a specified data center that is in a region closer to a location of a storage system, e.g., a persistent storage system that stores data received from all the data centers in the distributed computing system, so that the time required to store and/or retrieve the application data is minimized. For example, if a number of messages received and/or sent by a user exceeds a specified threshold, the application is moved closer to a specified data center that is in a region closer to the persistent storage system so that the time required to store and/or retrieve the messages is minimized. The embodiments determine a region that is most proximate to the persistent storage system, e.g., based on a location of the load-balancing servers the client device is connecting to, and migrates the application to the specified data center.

The embodiments can analyze the access logs on a predefined schedule or in response to occurrence of an event, e.g., user moving from one region to another, and determine the data center to which the application for the user has to be moved, e.g., to improve latency or throughput.

Figure 1:
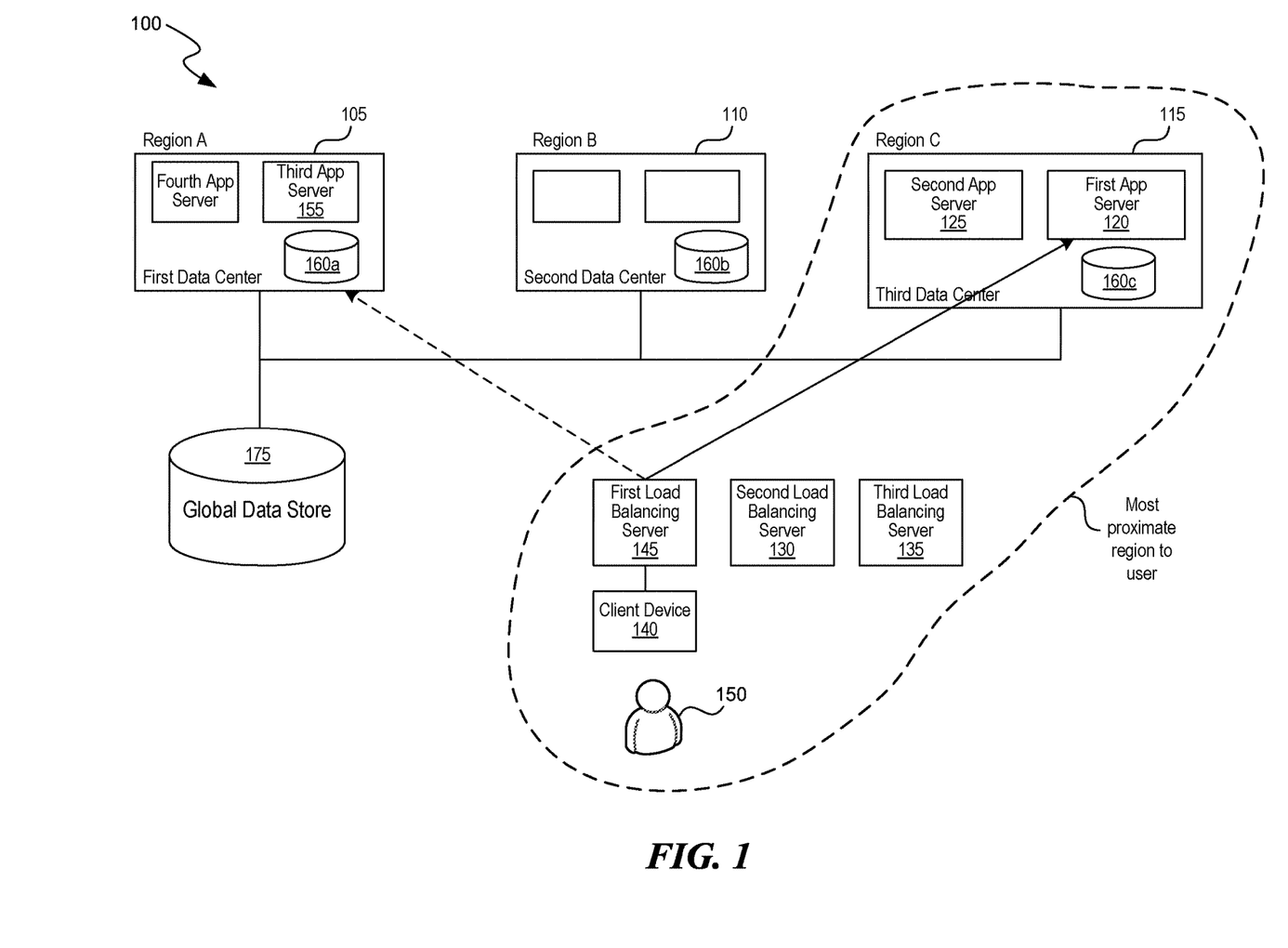
FIG. 1 is a block diagram illustrating an environment in which the disclosed embodiments may be implemented.

Turning now to the figures, FIG. 1 is a block diagram illustrating an environment 100 in which the disclosed embodiments may be implemented. The environment 100 includes a number of data centers that are distributed across geographical locations. For example, a first data center 105 is located in "Region A," a second data center 110 is located in "Region B," and a third data center 115 is located in "Region C." A region can be a country, a continent, a city or some other geographical area/location. Each of the data centers includes one or more app servers that can execute an application. For example, a third data center 115 includes a first app server 120 and a second app server 125. The application can be a social networking application that allows the users to manage user profile data, post comments, photos, and/or can be a messaging service of the social networking application that enables the users to exchange messages. The application can also be a messenger service that enables users of the application to exchange messages.

The environment 100 includes a number of load-balancing servers, e.g., a first load-balancing server 145, a second load-balancing server 130 and a third load-balancing server 135. The load-balancing servers can be distributed across geographical locations. For example, load-balancing servers can be distributed across cities, countries, continents or other physical locations or geographical areas. When the user 150 requests access to the application, the client device 140 transmits the request to a load-balancing server and the load-balancing server forwards the request to one of the data centers, and an app server in that data center serves the access request. The user 150 can request access to the application using a client device 140. The client device 140 can be any computing device that is capable of accessing or using the application, e.g., a desktop PC, a laptop, a smartphone, a tablet PC, a wearable device. The user 150 can access the application from the client device 140 via a web browser or an app installed at the client device 140.

The client device 140 can transmit the request to any of the load-balancing servers. In some embodiments, the client device 140 transmits the request to a load-balancing server, e.g., the first load-balancing server 145, that is most proximate to the location of the client device 140. In some embodiments, the client device 140 can also transmit the request to other load-balancing servers, e.g., if the user 150 is traveling, a specified load-balancing server is temporarily not active.

As described above, the application can be associated with a dataset. For example, the application can be associated with user data of the users, e.g., messages sent and/or received by users, user profile data, photos posted by the users, comments made by the users. The dataset can be partitioned into a number of shards, each of which can contain a portion of the dataset. In some embodiments, a shard is a logical partition of data in a database. Each of the shards can contain data of a subset of the users. For example, a first shard "S1" can contain data associated with one thousand users, e.g., users with ID "1" to "1000." Similarly, a second shard "S2" can contain data associated with users of ID "1001" to "2000", and a third shard "S3" can contain data associated with users of ID "2001" to "3000". The shards can be stored at a distributed storage system 160 associated with the application. The distributed storage system 160 can be distributed across multiple data centers and a data center can store at least a subset of the shards. For example, the first data center 105 can store a first set of shards in a first storage system 160*a*, the second data center 115 can store a second set of shards in a second storage system 160*b* and the third data center 115 can store a third set of shards in the third storage system 160*c*. A shard manager component, which is described in additional detail at least with reference to FIG. 3, can manage the assignments of data centers and app servers for the shards. In some embodiments, the environment 100 includes a global storage system, e.g., a global data store 175, that stores data from each of the shards from each of the data centers. Each of the data centers can "flush" the data from their corresponding storage systems to the global data store 175. The global data store 175 is a persistent storage system and can be a distributed storage system.

The first load-balancing server 145 can determine the data center to which the access request from the user 150 is to be transmitted in a number of ways. In some embodiments, the first load-balancing server 145 determines the data center based on a hash value of a user ID of the user 150. For example, the first load-balancing server 145 applies a hash function to the user ID to determine a specified shard with which the user 150 is to be associated. After the specified shard is determined, the first load-balancing server 145 can determine the data center, e.g., the first data center 105, and an app server in the data center, e.g., a third app server 155, to which the request is to be transmitted based on the shard-data center assignments and the shard-server assignments managed by the shard manager component. The first load-balancing server 145 can then transmit the request to the third app server 155 which can serve the access request of the user 150, e.g., enable the user 150 to access the messenger service executing at the third app server 155 to send a message to another user.

As described above, the data centers and the load-balancing servers can be distributed across geographical regions. In some embodiments, each of the regions can be a different geographical region, e.g., a country, a continent. Typically, latency between servers within a particular region is lesser than that of between servers in different regions. In some embodiments, two systems are considered to be in different regions if the latency between them is beyond a specified threshold. In some embodiments, processing the request from a data center that is most proximate to a location of the user 150 can decrease the latency associated with accessing the application. The embodiments can determine whether latency will be reduced by moving the application from the current data center to another data center, and then move the application if the latency is expected to decrease.

Figure 2:
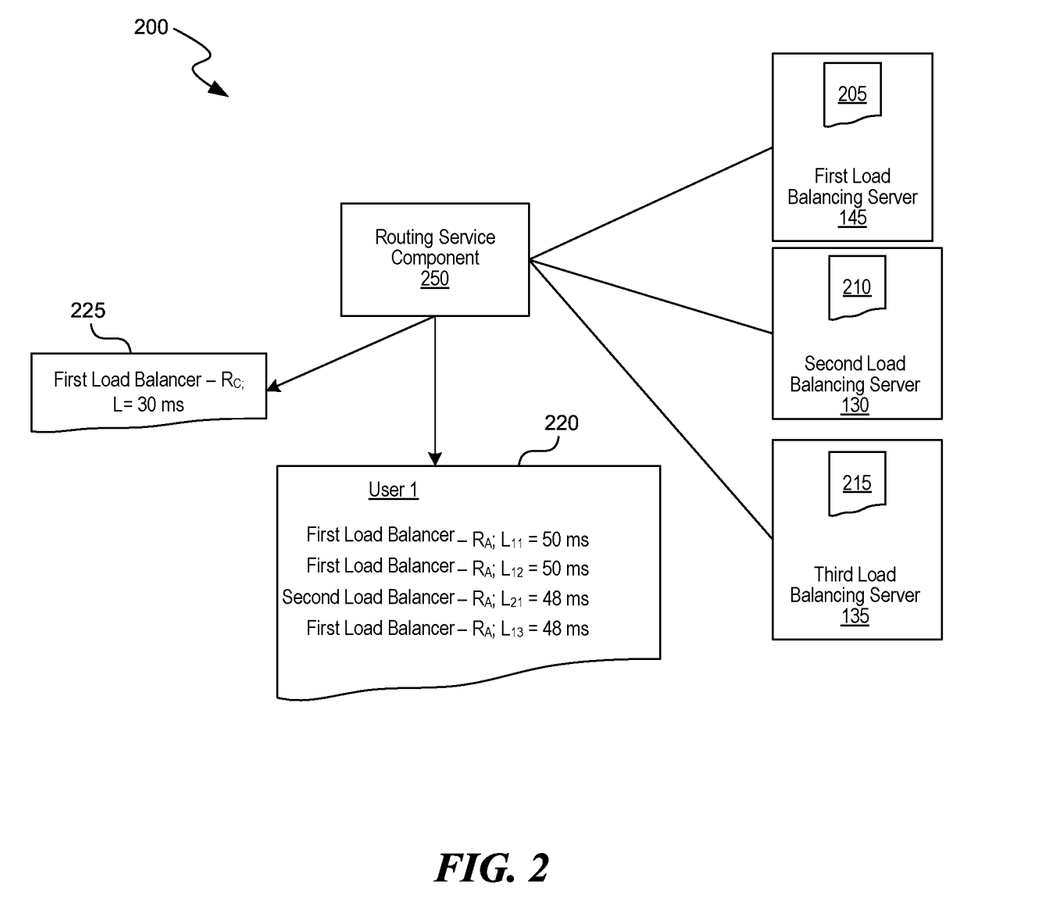
FIG. 2 depicts a block diagram of a routing service component to analyze access logs to determine various factors for migrating an application from a data center in one region to a data center in another region, consistent with various embodiments.

FIG. 2 depicts a block diagram of a routing service component to analyze access logs to determine various factors for migrating the application from a data center in one region to a data center in another region, consistent with various embodiments. An access log includes information regarding application accesses made by the users of the application. For example, a first access log 205 of the first load-balancing server 145 can include information such as users and/or client devices accessing the first load-balancing server 145, a specified data center and a specified app server in the specified data center to which the first load-balancing server forwarded each of the access requests to, and a latency between the first load-balancing server 145 and the app server to which an access request was forwarded for each of the access requests. In some embodiments, each of the multiple load-balancing servers can generate an access log for access requests received at the corresponding load-balancing servers, and can include the above information for each of the users accessing the application through the corresponding load-balancing server. For example, the second load-balancing server 130 can generate a second access log 210 that includes above information for access requests received at the second load-balancing server 130 and the third load-balancing server 135 can generate a third access log 215 that includes above information for access requests received at the third load-balancing server 135.

The routing service component 250 analyzes the logs of the load-balancing servers and generates an access report 220. The access report 220 includes information such as a specified load-balancing server a client device, e.g., the client device 140, sent the access request to, a specified data center (and optionally a specified app server in the specified data center) to which the specified load-balancing server forwarded the access request, and a latency between the specified load-balancing server and the specified data center. The access report 220 includes the above information for each of the multiple access requests made by the user 150 and across the load-balancing servers. The access report 220 can include the above information for one or more users of the application.

By analyzing the access report 220, the routing service component 250 can determine a load-balancing server that a client device has connected with the most or sent a majority of the access requests to and identify a first latency between that load-balancing server and the data center to which the load-balancing server forwarded the access requests. For example, the routing service component 250 can determine that the client device 140 has connected with the first load-balancing server 145 the most and that the first latency between the first load-balancing server 145 and the first data center 105, which is located in "Region A," is "50 ms." The routing service component 250 can use any predefined function to arrive at the first latency. For example, the routing service component 250 can determine the first latency as an average of the latencies or as a maximum of the latencies involved in each of the access requests of the user 150 forwarded to the first data center 105 by the first load-balancing server 145.

As described above at least with reference to FIG. 1, the load-balancing servers can be distributed across geographical locations, and the client device 140 sends the access request to a load-balancing server that is most proximate to the location of the client device 140. For example, if a load-balancing server is located in the east coast of the United States and another load-balancing server is located in the west coast of the United States and the client device 140 is located nearer to the west coast than the east coast, the client device 140 can send the access request to the load-balancing server in the east coast. Accordingly, by identifying the load-balancing servers the client device 140 is connecting with most of the times, a location of the client device 140 can be determined and therefore, a data center that is most proximate to the client device 140 can be determined. In some embodiments, the routing service component 250 will have location information regarding the data centers and the load-balancing servers and can determine which data center is the most proximate to a load-balancing server, and therefore to a client device that connects to that load-balancing server. For example, the routing service component can determine that the third data center 115 located in "Region C" is the most proximate data center to the first load-balancing server 145 and therefore, to the client device 140.

After determining the third data center 115 as the most proximate data center to the client device 140, the routing service component 250 can then determine a second latency between the first load-balancing server 145 and the third data center 115. For example, the routing service component 250 can determine the second latency between the first load-balancing server 145 and the third data center 115 is "30 ms", as illustrated in a report 225. The routing service component 250 can compare the second latency and the first latency, determine whether the second latency satisfies a criterion, and migrate the application to the third data center 115 if the second latency satisfies the criterion. For example, the routing service component 250 can determine that the second latency satisfies the criterion if the second latency is less than the first latency by a specified percentage, e.g., "20%." In the above-described example, the second latency of "30 ms" satisfies the criterion and therefore, the routing service component 250 can determine to migrate the application from the first data center 105 to the third data center 115. In some embodiments, the criterion is set such that the user 150 would be benefitted by such a migration, e.g., the user 150 would experience significantly less delay in accessing the application.

In some embodiments, a similar analysis can be performed to improve a throughput of the application by identifying a data center that has the best throughput for the user 150 compared to the data centers from which the user 150 is currently being served. In some embodiments, such a data center is the one that is most proximate to the location of the global data store 175 as the rate of the read and/or write operations associated with that data center would be significantly higher compared to that of the other data centers.

Figure 3:
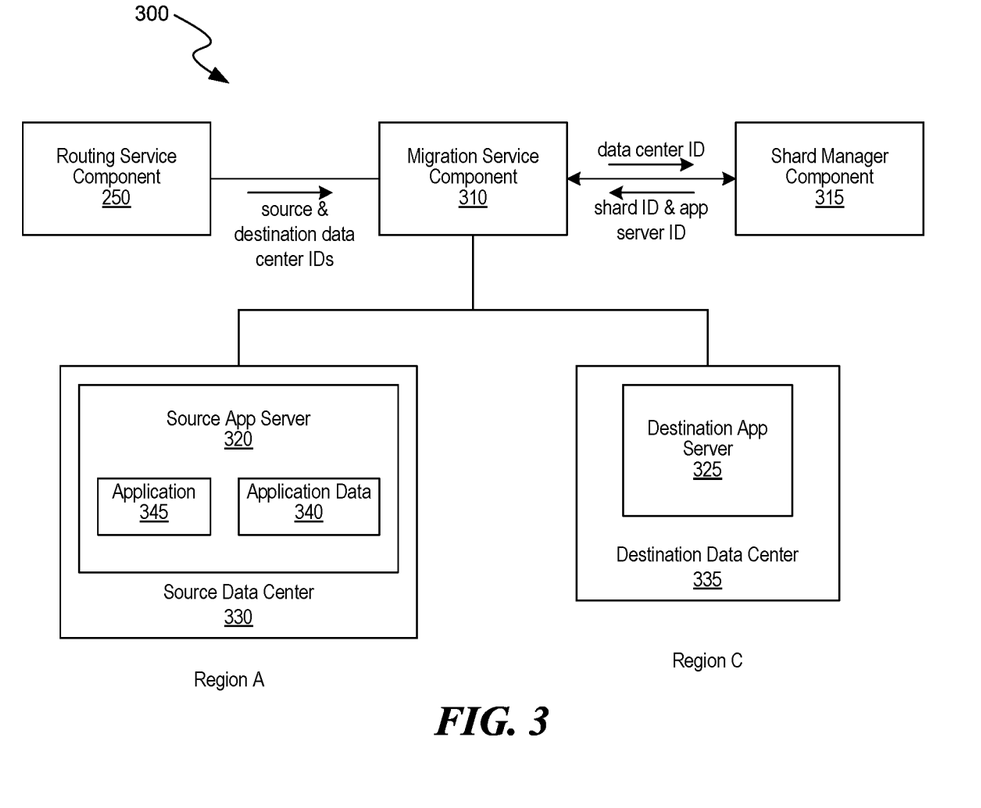
FIG. 3 depicts a block diagram for migrating the application from a source data center to a destination data center, consistent with various embodiments.

FIG. 3 depicts a block diagram for migrating the application from a source data center to a destination data center, consistent with various embodiments. After the routing service component 250 determines that the application, e.g., application 345, is to be migrated from a source data center 330 to a destination data center 335, a migration service component 310 can migrate the application 345 from the source data center 330 to the destination data center 335. In some embodiments, the source data center 330 is similar to the first data center 105 of FIG. 1 and the destination data center 335 is similar to the third data center 115.

To migrate the application 345 to the destination data center 335, the migration service component 310 may have to know the shard with which the user 150 is to be associated. As described above, different shards are assigned to different data centers, and different shards can be hosted by different app servers within a data center. The migration service component 310 can determine the shard with which the user 150 is to be associated using a shard manager component 315.

A shard manager component 315 can manage the assignments of data centers for the shards. In some embodiments, the assignments are input by a user, e.g., an administrator associated with the application. In some embodiments, the shard manager component 315 can determine the shard assignments based on shard-region assignment policies provided by the administrator. The shard manager component 315 can store the assignments of the regions, e.g., data centers in the regions, to the shards as a shard-data center mapping, e.g., in a storage system associated with the shard manager component 315 (not illustrated). For example, the shard manager component 315 can assign a first set of shards to the first data center 105 and a third set of shards to the third data center 115. The shard manager component 315 can also manage the assignment of shards to the app servers within a data center. For example, the shard manager component 315 can assign a first shard in the third set of shards to the first app server 120 in the third data center 115 and a second shard in the third set of shards to the second app server 125 in the third data center 115. In some embodiments, the assignments are input by the administrator. In some embodiments, the shard manager component 315 can determine the shard assignments based on shard-server assignment policies provided by the administrator. The shard manager component 315 can store the shard-server assignments as a shard-server mapping, e.g., in the storage system associated with the shard manager component 315.

The routing service component 250 sends information regarding the source data center 330 and the destination data center 335 to the migration service component 310. For example, the routing service component 250 can send a data center ID of the destination data center 335, which is a data center in a region that is most proximate to the client device 140, to the migration service component 310. The migration service component 310 can use the data center ID to obtain a set of shards assigned to the destination data center 335 from the shard manager component 315, and then select a specified shard from the set of shards with which to associate the user 150. The migration service component 310 and/or the shard manager component 315 can select the specified shard based on various criteria. For example, the specified shard can be randomly selected from the set of shards. In another example, a shard that has least amount of activity from associated users can be selected. In another example, a shard whose size is the least among the set of shards can be selected. The migration service component 310 and/or the shard manager component 315 can store the assignment of the user to the shard in a shard-user mapping data structure in the storage system. After the migration service component 310 chooses the specified shard, the shard manager component 315 can obtain an app server, e.g., a destination app server 325, in the destination data center 335 that hosts the specified shard, e.g., using the shard-server mapping. The migration service component 310 can then migrate the application 345 and the application data 340 to the destination app server 325. In some embodiments, the destination app server 325 is similar to the first app server 120 in the third data center 115.

In some embodiments, migrating the application 345 includes copying the application 345, e.g., executable code of the application 345, and application data 340 from the source app server 320 to the destination app server 325. For example, the application 345 can be a messenger service in a social networking application. The application data 340 can include a message queue that has messages associated with a user, e.g., messages that are sent by the user 150 but are yet to be delivered to the recipient, messages that are received for the user 150 but are yet to be delivered to the user 150, or messages that are not flushed to the global data store 175 yet. If the destination app server 325 already includes the application 345, the application 345 is configured to provide access to the user 150.

In some embodiments, the migration service component 310 can block any incoming write requests for the user 150 while the application 345 is being migrated from the source app server 320 to the destination app server 325, e.g., in order to minimize delaying the copying of the application data 340 to the destination app server 325. The data associated with the incoming write requests may not be written to a storage system (not illustrated) associated with the source data center 330. After the application 345 is migrated to the destination data center 335 successfully, the data associated with write requests is then forwarded to the destination app server 325. For example, if the user 150 is sending a first message to another user and/or receiving a second message from another user, the first and second messages may not be written to the message queue until all the messages in the message queue are copied to the destination app server 325. The first and second messages are forwarded to the destination app server 325 after all the messages in the message queue are copied entirely to the destination app server 325.

After the migration is completed successfully, the shard-user mapping is updated to indicate that the user 150 is now associated with the specified shard in the destination data center 335, and any access requests from the user 150 is forwarded to the destination app server 325 that is hosting the specified shard. In some embodiments, the shard-user mapping is not updated about the assignment of the user 150 to the specified shard until the migration of the application 345 has completed successfully. If the shard-user mapping is updated before the migration is completed, the load-balancing server would forward the access request from the user 150 to the destination app server 325 and if the destination app server 325 does not have all the application data 340 yet, the user 150 may experience data loss. Accordingly, the shard-user mapping is not updated until the migration has completed successfully and any application access requests from the user 150 that is received during the migration is either processed by the source app server 320 or blocked at the source app server 320.

Figure 4:
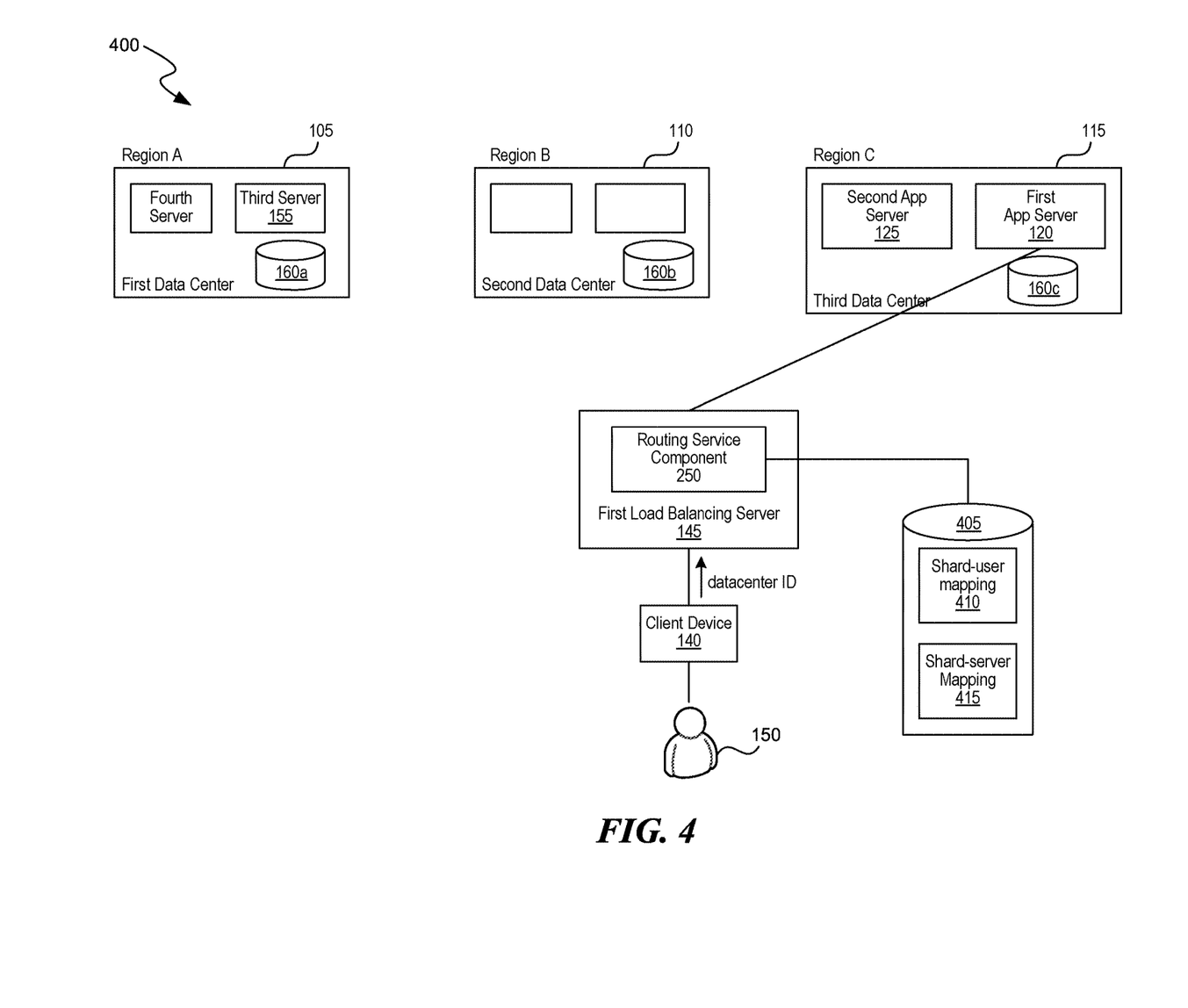
FIG. 4 is a block diagram illustrating forwarding application access requests from a user to a specified data center based on a hint in an access request, consistent with various embodiments.

FIG. 4 is a block diagram illustrating forwarding application access requests from a user to a specified data center based on a hint in the access request, consistent with various embodiments. When the routing service component 250 determines that the client device 140 would be benefited when the application is migrated from the first data center 105 to the third data center 115 (e.g., as described at least with reference to FIG. 2), the routing service component 250 indicates the migration service component 310 to migrate the application to the third data center 115, and sends to the client device 140 a hint that indicates a data center which processes access requests from the client device 140. In some embodiments, the hint can be a data center ID of a data center, e.g., the third data center 115, that has to process the access request from the client device. For example, the data center ID can be of a data center that is most proximate to the location of the client device 140 if the migration is performed to improve latency, or a data center that is most proximate to the location of the global data store 175 if the migration is performed to improve the throughput of the application. The client device 140 can include this data center ID in an access request for accessing the application.

When the first load-balancing server 145 receives the access request from the client device 140, it determines that the access request includes a data center ID, and that the access request for the user 150 has to be forwarded to the corresponding data center. The first load-balancing server 145 determines, e.g., using the routing service component 250, the shard with which the user 150 is associated and the app server, e.g., the first app server 120, hosting that shard. The routing service component 250 can determine the shard and the app server, using the shard-user mapping 410 stored at a storage system 405. The shard-user mapping 410 and the shard-server mapping 415 can be managed by the shard manager component 315. After the first load-balancing server 145 determines the app server, the first load-balancing server 145 forwards the access request from the user 150 to the corresponding app server, e.g., the first app server 120 in the third data center 115.

The routing service component 250, the migration service component 310 and the shard manager component 315 can be implemented on separate stand-alone server computers, or as distributed components where different portions of the components are implemented on different server computers, or one or more of them can be combined with existing servers in the distributed computing system. For example, the routing service component 250 can be part of the load-balancing servers or can be a separate server. In some embodiments, the components, servers and/or any other modules described at least with reference to FIGS. 1-4 together form a distributed computing system. The distributed computing system may also include other components, servers and/or modules that are required for the working of the disclosed embodiments in addition to those described at least with reference to FIGS. 1-4.

Figure 5:
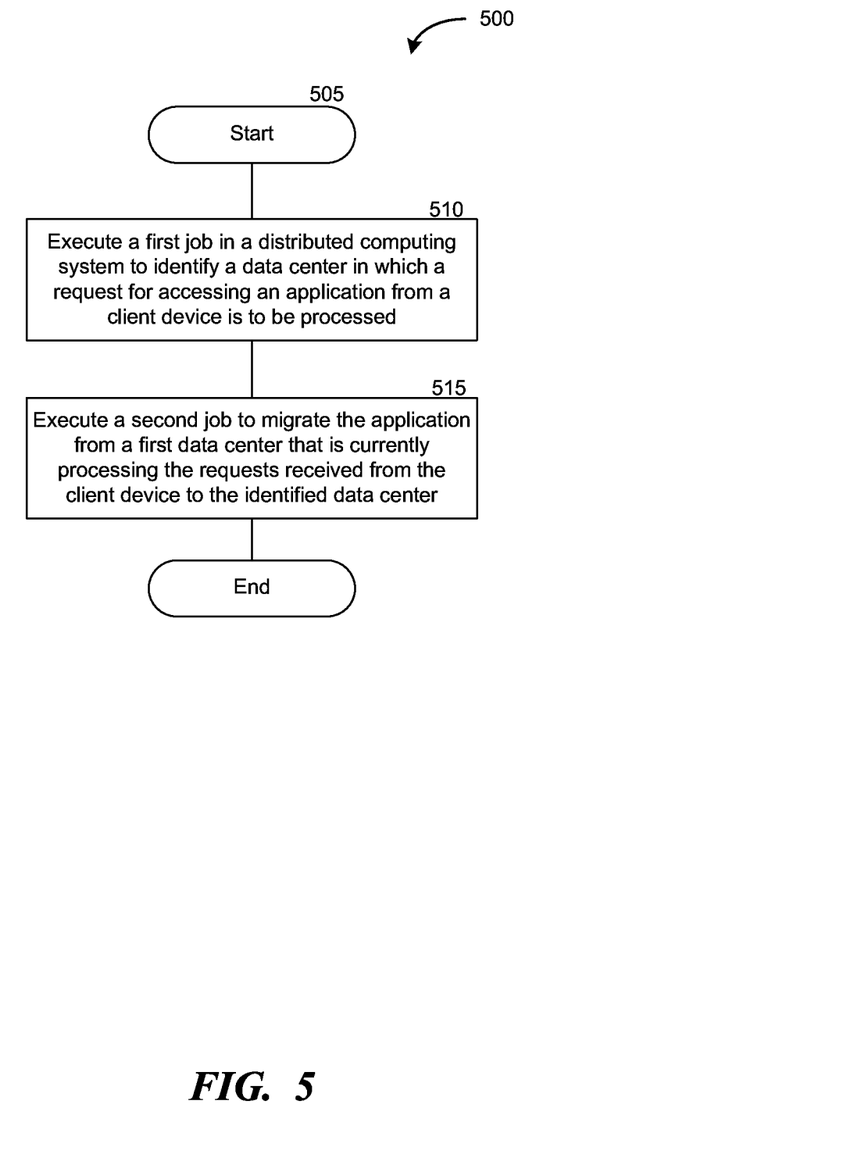
FIG. 5 is a flow diagram of a process of migrating the application from a source data center to a destination data center, consistent with various embodiments.

FIG. 5 is a flow diagram of a process 500 of migrating an application from a source data center to a destination data center, consistent with various embodiments. In some embodiments, the process 500 may be implemented in the environment 100 of FIG. 1. The process 500 begins at block 505, and at block 510, the routing service component 250 executes a first job in the distributed computing system to identify a data center, e.g., a destination data center, in which a request for accessing an application from a user, e.g., the user 150, is to be processed. In some embodiments, the application access requests from the user 150 may be being currently processed by one or more data centers, e.g., the first data center 105 or the source data center 330, in the distributed computing system. The first job can identify the data center that can process the access request more efficiently than the current data center, e.g., decrease the latency involved in accessing the application for the user 150, increase the throughput of the application for the user 150. In some embodiments, if the latency in accessing the application is to be improved, the routing service component 250 determines a data center located in a region that is most proximate to the user 150, e.g., the client device 140. In some embodiments, if the throughput of the application is to be improved, the routing service component 250 determines a data center located in a region that is most proximate to a global data store, e.g., global data store 175, which is a persistent storage system that stores data from all data centers. In some embodiments, the first job can be performed by executing a script that includes instructions to identify the data center based on the specified factors, e.g., latency or throughput.

At block 515, the migration service component 310 executes a second job to migrate the application from the source data center that is currently processing the access requests received from the client device to the destination data center. In some embodiments, migrating the application from one data center to another data center includes migrating the application from a source app server in the source data center to a destination app server in the destination data center. In some embodiments, the second job can be performed by executing a script that includes instructions to migrate the application from the source app server to the destination app server. Additional details with respect to identifying a data center and migrating the application to the data center are described at least with reference to FIGS. 6 and 7 below.

Figure 6:
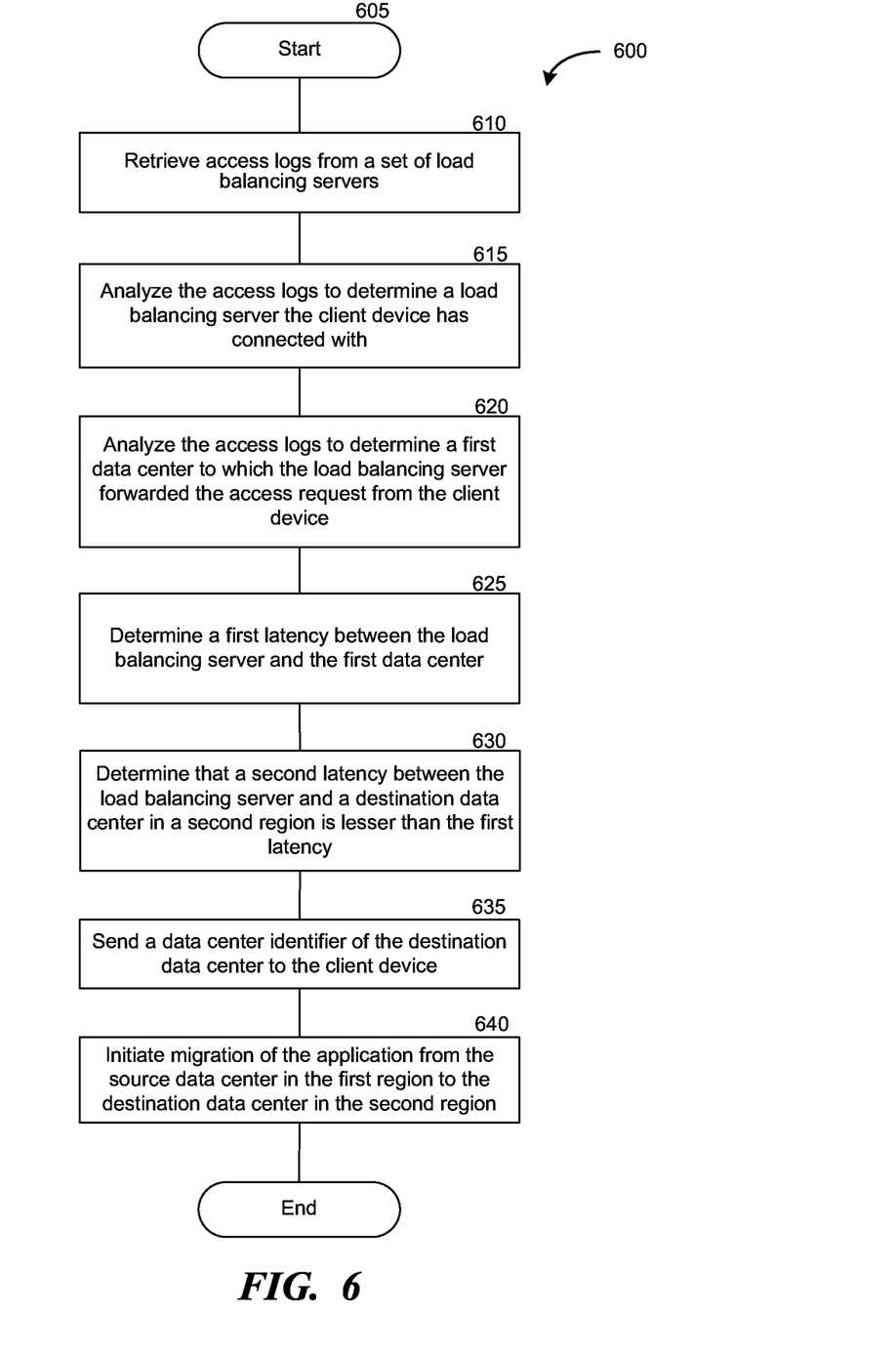
FIG. 6 is a flow diagram of a process of determining a destination data center to which the application is to be migrated, consistent with various embodiments.

FIG. 6 is a flow diagram of a process 600 of determining a destination data center to which the application is to be migrated, consistent with various embodiments. In some embodiments, the process 600 may be implemented in the environment 100 of FIG. 1 and using the routing service component 250 of FIG. 2. In some embodiments, the process 600 may be part of the process performed in association with block 510 of FIG. 5. The process 600 begins at block 605, and at block 610, the routing service component 250 retrieves access logs, e.g., access logs 205-215, from a set of load-balancing servers in the distributed computing system, e.g., the load-balancing servers 130-145.

At block 615, the routing service component 250 analyzes the access logs to determine a load-balancing server the client device 140 has connected with, e.g., for most of the access requests. For example, the routing service component 250 determines that the client device 140 has transmitted most of the access requests to the first load-balancing server 145.

At block 620, the routing service component 250 analyzes the access logs to determine a source data center to which the load-balancing server (e.g., the one identified in block 615) forwarded the access requests from the client device 140 for accessing the application. For example, the routing service component 250 determines that the first load-balancing server 145 transmitted the access request from the client device 140 to the source data center 330.

At block 625, the routing service component 250 determines a first latency between the load-balancing server and the source data center, e.g., an app server in the source data center, to which the access request was transmitted. For example, the routing service component 250 determines the latency between the first load-balancing server 145 and the source app server 320 in the source data center 330 as "50 ms." In some embodiments, the first latency is determined as a function of latencies associated with multiple access requests forwarded to the data center from the load-balancing server. In some embodiments, the first latency is determined as an average of the latencies associated with the multiple access requests. In some embodiments, the first latency is determined as a maximum of the latencies associated with the multiple access requests.

At block 630, the routing service component 250 determines a second latency between the load-balancing server and a destination data center, e.g., any of the app servers of the destination data center, in a second region, e.g., a data center located in a region that is most proximate to the client device. The routing service component 250 determines that the second latency is lesser than the first latency. For example, the routing service component 250 determines that the latency between the destination data center 335, which is the most proximate data center to the client device 140, and the first load-balancing server 145 is "30 ms."

After determining the second latency, the routing service component 250 determines whether the second latency satisfies the criteria, e.g., second latency is less enough, to migrate the application to a destination data center in the second region. In some embodiments, an administrator of the application may set the criteria for determining whether the second latency is less enough to migrate the application. For example, the criteria can be that the second latency is less than the first latency by a specified percentage.

If the routing service component 250 determines that the second latency satisfies the criteria for migrating the application, at block 635, the routing service component 250 sends a data center ID of the destination data center in the second region to the client device. For example, the routing service component 250 sends a data center ID of the destination data center 335 to the client device 140.

At block 640, the routing service component 250 initiates a migration of the application from an app server in the source data center to an app server in the destination data center. For example, the routing service component 250 notifies the migration service component 310 to migrate the application 345 from the source app server 320 in the source data center 330 to the destination app server 325 in the destination data center 335.

Figure 7:
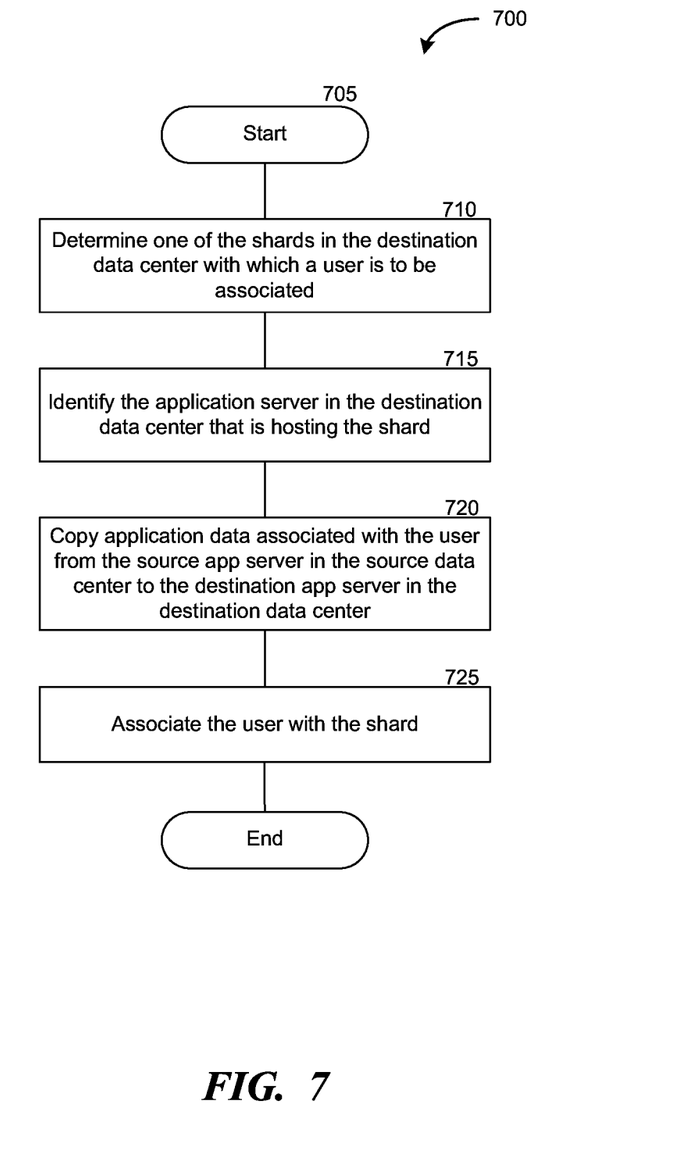
FIG. 7 is a flow diagram of a process of migrating the application from a source data center to a destination data center, consistent with various embodiments.

FIG. 7 is a flow diagram of a process 700 of migrating the application from a source data center to a destination data center, consistent with various embodiments. In some embodiments, the process 700 may be implemented in the environment 100 of FIG. 1 and using the migration service component 310 of FIG. 3. In some embodiments, the process 700 may be part of the process performed in association with block 515 of FIG. 5. The process 700 begins at block 705, and at block 710, the migration service component 310 determines a shard with which the user 150 is to be associated. Since the application access requests of the user 150 is to be served by the destination data center, the migration service component 310 associates the user 150 with one of the shards assigned to the destination data center. In some embodiments, the migration service component 310 obtains the list of shards assigned to the destination data center from the shard manager component 315. The migration service component 310 and/or the shard manager component 315 can then associate the user 150 with one of those shards.

At block 715, the migration service component 310 identifies the app server in the destination data center that is hosting the shard with which the user 150 is to be associated. For example, the migration service component 310 identifies that the destination app server 325 in the destination data center 335 is hosting the shard with which the user 150 is to be associated. In some embodiments, the migration service component 310 obtains information regarding the app server, e.g., app server ID, that is hosting the shard from the shard manager component 315. The shard manager component 315 manages the assignments of shards to app servers in a shard-server mapping 415.

At block 720, the migration service component 310 copies the application and the application data associated with the user 150 from the source app server in the source data center to the destination app server in the destination data center. For example, the migration service component 310 migrates the application 345 and the application data 340 from the source app server 320 in the source data center 330 to the destination app server 325 in the destination data center 335.

After the migration of the application 345 and the application data 340 is completed successfully, at block 725, the migration service component 310 associates the user 150 with the shard, and updates the shard-user mapping 410 to indicate that the user 150 is now associated with a new shard (e.g., identified in block 710).

Figure 8:
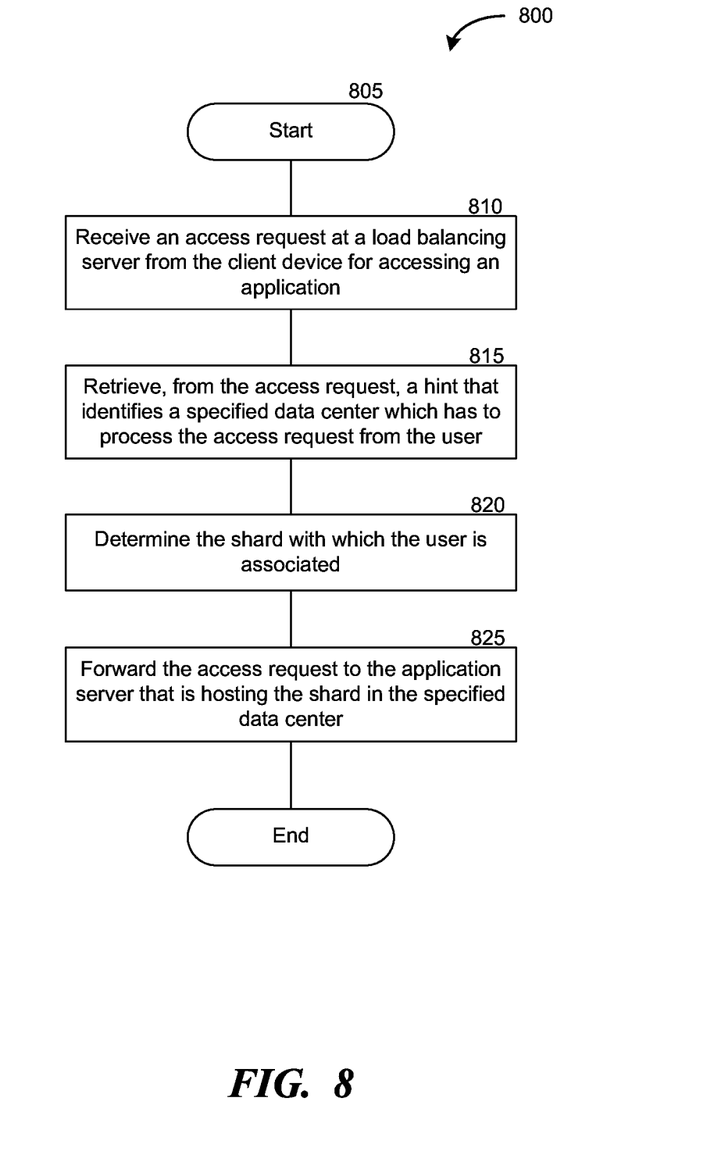
FIG. 8 is a flow diagram of a process of forwarding an access request for accessing an application to a specified data center, consistent with various embodiments.

FIG. 8 is a flow diagram of a process 800 of forwarding an access request for accessing an application to a specified data center, consistent with various embodiments. In some embodiments, the process 800 may be implemented in the environment 100 of FIG. 1. The process 800 begins at block 805, and at block 810, the first load-balancing server 145 receives an access request from a user for accessing an application in the distributed computing system. In some embodiments, when the user 150 requests access for the application, the client device 140 sends the access request to a load-balancing server that is most proximate to the location of the client device 140.

At block 815, the first load-balancing server 145 confirms that the access request includes a hint that indicates a data center which has to process the access request. In some embodiments, the hint is a data center ID of the data center.

At block 820, the first load-balancing server 145 determines the shard with which the user is associated. In some embodiments, the first load-balancing server 145 obtains the shard information from the routing service component 250, which can obtain the information from the shard-user mapping 410.

At block 825, the first load-balancing server 145 forwards the access request to the app server that is hosting the shard in the specified data center.

Figure 9:
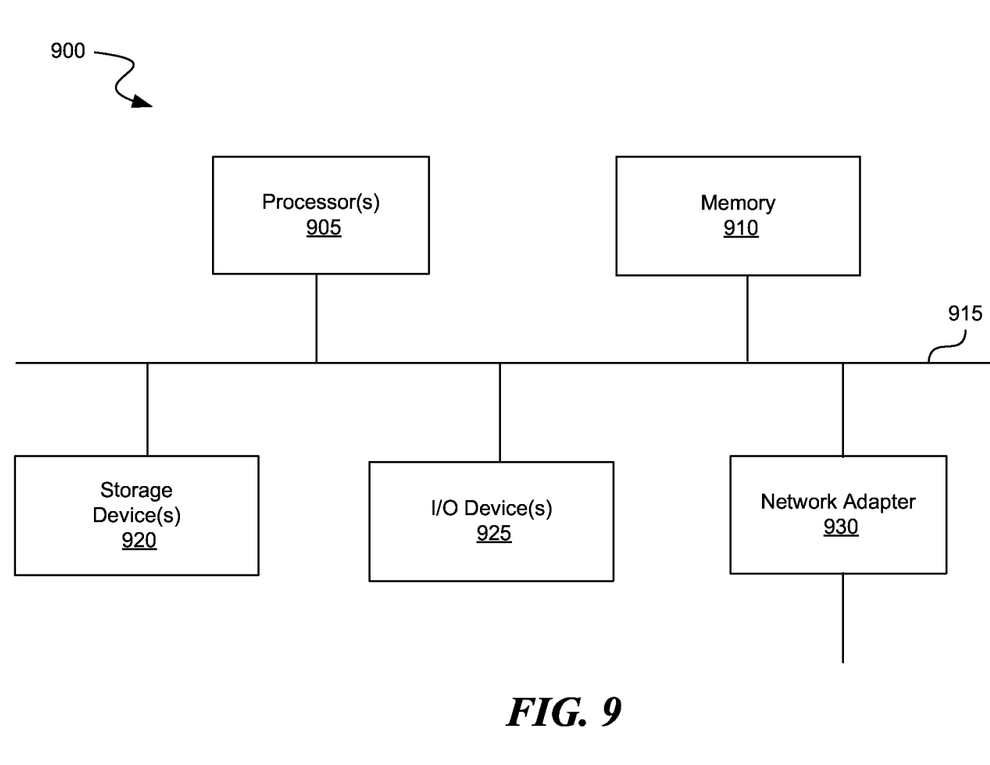
FIG. 9 is a block diagram of a processing system that can implement operations, consistent with various embodiments.

FIG. 9 is a block diagram of a computer system as may be used to implement features of the disclosed embodiments. The computing system 900 may be used to implement any of the entities, components or services depicted in the examples of the foregoing figures (and any other components and/or modules described in this specification). The computing system 900 may include one or more central processing units ("processors") 905, memory 910, input/output devices 925 (e.g., keyboard and pointing devices, display devices), storage devices 920 (e.g., disk drives), and network adapters 930 (e.g., network interfaces) that are connected to an interconnect 915. The interconnect 915 is illustrated as an abstraction that represents any one or more separate physical buses, point to point connections, or both connected by appropriate bridges, adapters, or controllers. The interconnect 915, therefore, may include, for example, a system bus, a Peripheral Component Interconnect (PCI) bus or PCI-Express bus, a HyperTransport or industry standard architecture (ISA) bus, a small computer system interface (SCSI) bus, a universal serial bus (USB), IIC (I2C) bus, or an Institute of Electrical and Electronics Engineers (IEEE) standard 1394 bus, also called "Firewire".

The memory 910 and storage devices 920 are computer-readable storage media that may store instructions that implement at least portions of the described embodiments. In addition, the data structures and message structures may be stored or transmitted via a data transmission medium, such as a signal on a communications link. Various communications links may be used, such as the Internet, a local area network, a wide area network, or a point-to-point dial-up connection. Thus, computer readable media can include computer-readable storage media (e.g., "non transitory" media).

The instructions stored in memory 910 can be implemented as software and/or firmware to program the processor(s) 905 to carry out actions described above. In some embodiments, such software or firmware may be initially provided to the processing system 900 by downloading it from a remote system through the computing system 900 (e.g., via network adapter 930).

The embodiments introduced herein can be implemented by, for example, programmable circuitry (e.g., one or more microprocessors) programmed with software and/or firmware, or entirely in special-purpose hardwired (non-programmable) circuitry, or in a combination of such forms. Special-purpose hardwired circuitry may be in the form of, for example, one or more ASICs, PLDs, FPGAs, etc.

Remarks

The above description and drawings are illustrative and are not to be construed as limiting. Numerous specific details are described to provide a thorough understanding of the disclosure. However, in some instances, well-known details are not described in order to avoid obscuring the description. Further, various modifications may be made without deviating from the scope of the embodiments. Accordingly, the embodiments are not limited except as by the appended claims.

Reference in this specification to "one embodiment" or "an embodiment" means that a specified feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not for other embodiments.

The terms used in this specification generally have their ordinary meanings in the art, within the context of the disclosure, and in the specific context where each term is used. Terms that are used to describe the disclosure are discussed below, or elsewhere in the specification, to provide additional guidance to the practitioner regarding the description of the disclosure. For convenience, some terms may be highlighted, for example using italics and/or quotation marks. The use of highlighting has no influence on the scope and meaning of a term; the scope and meaning of a term is the same, in the same context, whether or not it is highlighted. It will be appreciated that the same thing can be said in more than one way. One will recognize that "memory" is one form of a "storage" and that the terms may on occasion be used interchangeably.

Consequently, alternative language and synonyms may be used for any one or more of the terms discussed herein, nor is any special significance to be placed upon whether or not a term is elaborated or discussed herein. Synonyms for some terms are provided. A recital of one or more synonyms does not exclude the use of other synonyms. The use of examples anywhere in this specification including examples of any term discussed herein is illustrative only, and is not intended to further limit the scope and meaning of the disclosure or of any exemplified term. Likewise, the disclosure is not limited to various embodiments given in this specification.

Those skilled in the art will appreciate that the logic illustrated in each of the flow diagrams discussed above, may be altered in various ways. For example, the order of the logic may be rearranged, substeps may be performed in parallel, illustrated logic may be omitted; other logic may be included, etc.

Without intent to further limit the scope of the disclosure, examples of instruments, apparatus, methods and their related results according to the embodiments of the present disclosure are given below. Note that titles or subtitles may be used in the examples for convenience of a reader, which in no way should limit the scope of the disclosure. Unless otherwise defined, all technical and scientific terms used herein have the same meaning as commonly understood by one of ordinary skill in the art to which this disclosure pertains. In the case of conflict, the present document, including definitions will control.

We claim:

1. A method performed by a computing system, comprising:
   identifying a server device that is providing to a client device access to an application executing at a first data center of multiple data centers by forwarding a request for accessing the application from the client device to the first data center, wherein at least some of the data centers are located in multiple regions, the first data center is located in a first region of the regions, and the server device comprises a load-balancing server device;
   determining a first latency between the first data center and the load-balancing server device;
   determining that a second latency between a second data center and the load-balancing server device is less than the first latency, wherein the second data center is located in a second region that is more proximate to a location of the client device than the first region;
   sending to the client device a hint that indicates the second data center to enable the client device to include the hint within a future access request for accessing the application, the hint comprising a data center identifier of the second data center;
   migrating the application from the first data center to the second data center, wherein the migrating includes copying application data associated with a user associated with the client device from a first application server device of the first data center to a second application server device of the second data center;
   determining a third data center of the data centers whose application data throughput is higher than throughput of the first data center;
   migrating the application from the first data center to the third data center; and
   updating a shard-user mapping to indicate that the user is associated with a shard that is hosted by a third application server device in the third data center.

2. The method of claim 1, wherein determining that the second latency is less than the first latency further includes sending a data center identifier of the second data center to the client device.

3. The method of claim 2, wherein the data center identifier is sent to the client device at any of a predefined interval, installation time of the application at the client device, or a time of determination that the second latency is less than the first latency.

4. The method of claim 1, wherein migrating the application includes:
   determining a specified shard with which a user of the client device is to be associated, wherein the specified shard stores data associated with a subset of users of the application;
   identifying one of multiple application server devices in the second data center that is hosting the specified shard, the one of the application server devices being the second application server device; and
   copying the application data from a current shard hosted by the first application server device to the specified shard hosted by the second application server device.

5. The method of claim 4, wherein the specified shard is determined based on a presence of a data center identifier in the request received from the client device for accessing the application, wherein the specified shard is one of multiple shards hosted by the second data center.

6. The method of claim 4, wherein migrating the application data further includes:
   blocking incoming application data at the first application server device while the application data is being copied to the second application server device;
   routing the incoming application data to the second application server device after the application data is copied to the second application server device successfully; and
   updating a shard-user mapping to indicate that the user is associated with the specified shard.

7. The method of claim 1, further comprising:
   receiving, from the client device and at the server device, the request for accessing the application, the request including a data center identifier that identifies the second data center to which the request is to be transferred; and
   forwarding, by the server device, the request to the second application server device of the second data center to provide access to the application.

8. The method of claim 7, wherein forwarding the request to the second application server device includes:
   confirming a presence of the data center identifier in the request;
   retrieving, from a shard-user mapping, a shard with which the user is associated; and
   forwarding the request to the second application server device that is hosting the shard.

9. The method of claim 1, wherein the application includes a messaging application that enables the user to exchange messages with a second user of the application.

10. The method of claim 9, wherein the application data includes a first set of messages that is to be sent to the second user and a second set of messages received for the user.

11. The method of claim 1, further comprising: storing information regarding the server device and the first latency.

12. The method of claim 11, wherein storing the information regarding the server device and the first latency comprises storing the information in an access log at a storage system associated with the application.

13. The method of claim 1, wherein the third data center is more proximate to a persistent storage system associated with the data centers than the first data center is to the persistent storage system, the persistent storage system storing the application data associated with multiple users of the application.

14. The method of claim 1, wherein migrating the application to the third application server device includes determining whether to migrate the application to the second application server device or the third application server device as a function of a size of the application data.

15. The method of claim 1, further comprising:
   receiving, at the server device and from the client device, the request for accessing the application, the request including a data center identifier of the third data center of the data centers, wherein the third data center is more proximate to a persistent storage system associated with the data centers than the first data center is to the persistent storage system; and
   routing, by the server device and based on the data center identifier, the request to the third data center for providing access to the application.

16. A non-transitory computer-readable storage medium storing computer-readable instructions that, when executed by a physical processor of a computing device, cause the computing device to perform a method comprising:

identifying a server device that is providing to a client device access to an application executing at a first data center of multiple data centers by forwarding a request for accessing the application from the client device to the first data center, wherein at least some of the data centers are located in multiple regions, the first data center is located in a first region of the regions, and the server device comprises a load-balancing server device;

determining a first latency between the first data center and the load-balancing server device;

determining that a second latency between a second data center and the load-balancing server device is less than the first latency, wherein the second data center is located in a second region that is more proximate to a location of the client device than the first region;

sending to the client device a hint that indicates the second data center to enable the client device to include the hint within a future access request for accessing the application, the hint comprising a data center identifier of the second data center;

migrating the application from the first data center to the second data center, wherein the migrating includes copying application data associated with a user associated with the client device from a first application server device of the first data center to a second application server device of the second data center;

determining a third data center of the data centers whose application data throughput is higher than throughput of the first data center;

migrating the application from the first data center to the third data center; and updating a shard-user mapping to indicate that the user is associated with a shard that is hosted by a third application server device in the third data center.

17. The computer-readable storage medium of claim 16, wherein determining that the second latency is less than the first latency further includes sending a data center identifier of the second data center to the client device.

18. The computer-readable storage medium of claim 17, wherein the data center identifier is sent to the client device at any of a predefined interval, installation time of the application at the client device, or a time of determination that the second latency is less than the first latency.

19. The computer-readable storage medium of claim 16, wherein migrating the application further includes:

determining a specified shard with which a user of the client device is to be associated, wherein the specified shard stores data associated with a subset of users of the application;

identifying one of multiple application server devices in the second data center that is hosting the specified shard, the one of the application server devices being the second application server device; and copying the application data from a current shard hosted by the first application server device to the specified shard hosted by the second application server device.

20. The computer-readable storage medium of claim 16, wherein the application includes a messaging application that enables the user to exchange messages with a second user of the application.

* * * * *